United States Patent
Iwahara et al.

(10) Patent No.: US 6,466,400 B1
(45) Date of Patent: Oct. 15, 2002

(54) MAGNETIC DISK DRIVE CAPABLE OF REDUCING NOISE AT STARTING UTILIZING CONJOINING, DAMPED WASHERS TO SUPPORT SHAFTS IN THE DISK DRIVE

(75) Inventors: Hiroyuki Iwahara; Keiji Aruga; Yoshinori Ogawa; Yoshiaki Koizumi; Mitsuhiro Izumi; Mitsuaki Yoshida; Yasuhiro Miura, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 09/712,362

(22) Filed: Nov. 14, 2000

(30) Foreign Application Priority Data

Jan. 17, 2000 (JP) ........................................ 2000-008155

(51) Int. Cl.⁷ .............................................. G11B 17/02
(52) U.S. Cl. ................................. 360/99.08; 360/265.6
(58) Field of Search .......................... 360/98.07, 99.08, 360/265.6, 265.2

(56) References Cited

U.S. PATENT DOCUMENTS 5,563,750 A * 10/1996 Dew ....................... 360/98.07
5,870,253 A * 2/1999 Ogawa ..................... 360/265.6

FOREIGN PATENT DOCUMENTS

JP          5-258545          10/1993

* cited by examiner

Primary Examiner—A. J. Heinz
(74) Attorney, Agent, or Firm—Greer, Burns & Crain, Ltd.

(57) ABSTRACT

Disclosed herein is a magnetic disk drive including a spindle shaft fixed to a base, a coil mounted on the spindle shaft, a spindle hub rotatably mounted on the spindle shaft, a magnetic disk fixed to the spindle hub and having a plurality of tracks, a permanent magnet fixed to the spindle hub, a magnetic head for reading/writing information from/to the magnetic disk, and an actuator for moving the magnetic head across the tracks of the magnetic disk. The magnetic disk drive further includes a cover fixed to the base and having a hole at a position corresponding to the spindle shaft, a first metal washer placed on the cover at a portion around the hole, a second metal washer for sandwiching the cover at the portion around the hole in cooperation with the first metal washer, and a screw for securing the first and second metal washers to the spindle shaft.

9 Claims, 8 Drawing Sheets

MAGNETIC DISK DRIVE CAPABLE OF REDUCING NOISE AT STARTING UTILIZING CONJOINING, DAMPED WASHERS TO SUPPORT SHAFTS IN THE DISK DRIVE

BACKGROUND OF THE INVENTION

1. Field of the Invention

The present invention relates generally to a magnetic disk drive, and more particularly to a spindle shaft fixing structure capable of reducing a noise at starting a magnetic disk drive.

2. Description of the Related Art

In recent years, a magnetic disk drive as a kind of external storage device for a computer has been increasingly reduced in size, particularly in thickness, and low power consumption has been required. On the other hand, increasing the recording density of a magnetic disk to increase the capacity has been required, and the number of magnetic disks to be mounted in a magnetic disk drive is increasing. In a magnetic disk drive for a computer, a contact start and stop (CSS) system is generally adopted as the relation between a magnetic head and a magnetic disk. This system is such that while the magnetic disk is in rotation, the magnetic head is kept flying from the magnetic disk at a microscopic height owing to the balance between a flying force applied to the magnetic head by an air flow generated by high-speed rotation of the magnetic disk and an elastic force of a suspension pressing the magnetic head on the magnetic disk.

When the rotation of the magnetic disk is stopped, the magnetic head is moved to a contact zone formed on the magnetic disk and then comes into contact with the magnetic disk in the contact zone. While the magnetic disk is at rest, the magnetic head and the magnetic disk are kept in contact with each other. The magnetic disk is rotationally driven by a spindle motor. The spindle motor includes a spindle shaft fixed to a housing and a spindle hub rotatably mounted on the spindle shaft through a pair of bearings.

A plurality of magnetic disks equally spaced from each other are fixed to the spindle hub by alternately mounting the plural magnetic disks and a plurality of annular spacers on the spindle hub and securing a clamp to the spindle hub by means of screws. A coil is fixed to the spindle shaft, and a yoke and a permanent magnet are fixed to the spindle hub to form a rotor. The rotor is rotatably supported through a pair of ball bearings to the spindle shaft. In the conventional magnetic disk drive, the spindle shaft is fixed at its lower end to a base, and the upper end of the spindle shaft is fixed directly to a cover by a screw. Similarly, an actuator shaft is also fixed at its lower end to the base, and the upper end of the actuator shaft is fixed directly to the cover by a screw.

Since the spindle shaft and the cover are directly connected by the screw in the conventional magnetic disk drive, vibrations generated in the spindle motor are transmitted directly to the cover. As a result, vibrations are induced in the cover, causing an increased noise. Further, in an elastic deformation mode of the motor, the spindle shaft resonates to wave, and the waving of the spindle shaft causes resonance of the cover. Further, each ball bearing for rotatably supporting the spindle hub has a vibration frequency proportional to rotation, and the vibrations in the elastic deformation mode of the motor and the vibrations of ball components of the ball bearing cause resonance at a specific frequency (about 2.7 kHz), resulting in the generation of a grating resonant noise at starting the magnetic disk drive.

On the other hand, the actuator shaft is also connected directly to the cover by the screw. Accordingly, when an actuator for moving the magnetic head is energized to perform a seek operation (swing operation), vibrations of the actuator are transmitted to the cover as in the case of the spindle motor mentioned above, causing a noise due to the vibrations of the cover. In U.S. Pat. No. 5,483,397, a single metal washer having a viscoelastic member preliminarily attached thereto is interposed between a spindle shaft and a cover, and an upper end portion of the spindle shaft is fixed to the cover. According to this fixing structure, the transmission of vibrations of the spindle shaft to the cover can be suppressed. However, if shock is applied to the magnetic disk drive, there is a possibility that the fixing portion may be deformed to cause separation of the viscoelastic member.

SUMMARY OF THE INVENTION

It is therefore an object of the present invention to provide a magnetic disk drive which can reduce the noise at starting.

In accordance with an aspect of the present invention, there is provided a magnetic disk drive comprising a base; a shaft fixed to the base; a cover fixed to the base and having a hole at a position corresponding to the shaft; a first washer placed on the cover at a portion around the hole; a second washer for sandwiching the cover at the portion around the hole in cooperation with the first washer; and a screw for securing the first and second washers to the shaft.

Preferably, the first and second washers have elasticity. More preferably, each of the first and second washers has an outer diameter larger than the diameter of the hole, and the screw has a head having a diameter smaller than the diameter of the hole.

In accordance with another aspect of the present invention, there is provided a magnetic disk drive comprising a base; a spindle shaft fixed to the base; a coil mounted on the spindle shaft; a spindle hub rotatably mounted on the spindle shaft; a magnetic disk fixed to the spindle hub and having a plurality of tracks; a permanent magnet fixed to the spindle hub so as to define a gap between the coil and the permanent magnet; a magnetic head for reading/writing information from/to the magnetic disk; an actuator for moving the magnetic head across the tracks of the magnetic disk; a cover fixed to the base and having a hole at a position corresponding to the spindle shaft; a first metal washer placed on the cover at a portion around the hole and having an outer diameter larger than the diameter of the hole; a second metal washer for sandwiching the cover at the portion around the hole in cooperation with the first metal washer, the second metal washer having an outer diameter larger than the diameter of the hole; and a screw for securing the first and second metal washers to the spindle shaft.

Preferably, the magnetic disk drive further comprises a first annular viscoelastic member interposed between the first metal washer and the cover; and a second annular viscoelastic member interposed between the second metal washer and the cover. More preferably, when the screw is not tightened, the first and second metal washers are spaced from each other, whereas when the screw is tightened, the first and second metal washers come into close contact with each other.

In accordance with a further aspect of the present invention, there is provided a magnetic disk drive comprising a base; a spindle shaft fixed to the base; a coil mounted on the spindle shaft; a spindle hub rotatably mounted on the spindle shaft; a magnetic disk fixed to the spindle hub and having a plurality of tracks; a permanent magnet fixed to the spindle hub so as to define a gap between the coil and the permanent magnet; a magnetic head for reading/writing information from/to the magnetic disk; an actuator for moving the magnetic head across the tracks of the magnetic disk, the actuator having an actuator shaft fixed to the base; a cover fixed to the base and having a hole at a position corresponding to the actuator shaft; a first metal washer placed on the cover at a portion around the hole and having an outer diameter larger than the diameter of the hole; a second metal washer for sandwiching the cover at the portion around the hole in cooperation with the first metal washer, the second metal washer having an outer diameter larger than the diameter of the hole; and a screw for securing the first and second metal washers to the actuator shaft.

In accordance with a still further aspect of the present invention, there is provided a magnetic disk drive comprising a base; a spindle shaft fixed to the base; a coil mounted on the spindle shaft; a spindle hub rotatably mounted on the spindle shaft; a magnetic disk fixed to the spindle hub and having a plurality of tracks; a permanent magnet fixed to the spindle hub so as to define a gap between the coil and the permanent magnet; a magnetic head for reading/writing information from/to the magnetic disk; an actuator for moving the magnetic head across the tracks of the magnetic disk, the actuator having an actuator shaft fixed to the base; a cover fixed to the base and having a first hole at a position corresponding to the spindle shaft and a second hole at a position corresponding to the actuator shaft; a first metal washer placed on the cover at a portion around the first hole and having an outer diameter larger than the diameter of the first hole; a second metal washer for sandwiching the cover at the portion around the first hole in cooperation with the first metal washer, the second metal washer having an outer diameter larger than the diameter of the first hole; a first screw for securing the first and second metal washers to the spindle shaft; a third metal washer placed on the cover at a portion around the second hole and having an outer diameter larger than the diameter of the second hole; a fourth metal washer for sandwiching the cover at the portion around the second hole in cooperation with the third metal washer, the fourth metal washer having an outer diameter larger than the diameter of the second hole; and a second screw for securing the third and fourth metal washers to the actuator shaft.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
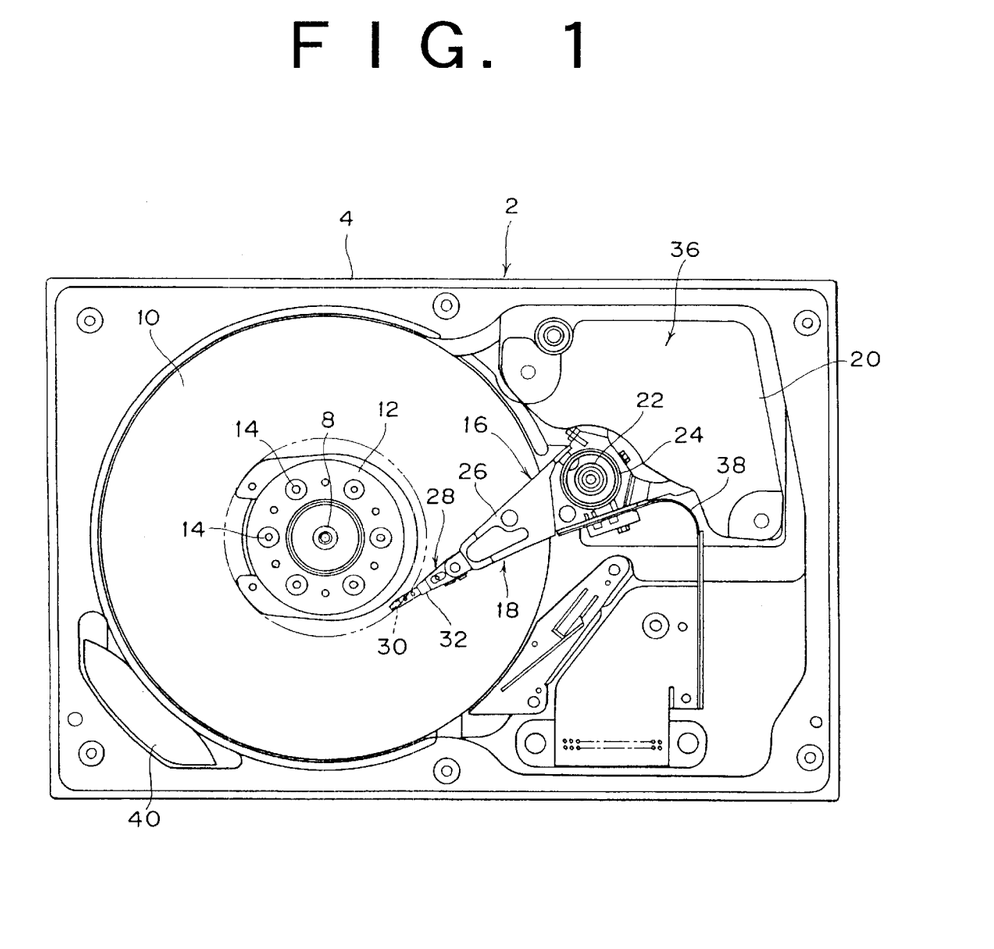
FIG. 1 is a plan view of a magnetic disk drive according to a first preferred embodiment of the present invention with a cover removed.

Referring to FIG. 1, there is shown a plan view of a magnetic disk drive according to a first preferred embodiment of the present invention with a cover 6 (see FIG. 2) removed. Reference numeral 2 denotes a housing consisting of a base 4 and the cover 6 fixed to the base 4. A spindle shaft 8 is fixed to the base 4, and a spindle hub (not shown in FIG. 1) is rotatably mounted on the spindle shaft 8. The spindle hub is driven by a DC motor (not shown in FIG. 1) to rotate about the spindle shaft 8. A plurality of magnetic disks 10 and spacers (not shown in FIG. 1) are mounted on the spindle hub so as to be alternately stacked. That is, the plural magnetic disks 10 are fixedly mounted on the spindle hub by securing a disk clamp 12 to the spindle hub by means of a plurality of screws 14, and are equally spaced a given distance by the spacers.

Reference numeral 16 denotes a rotary actuator consisting of an actuator arm assembly 18 and a magnetic circuit 20. The actuator arm assembly 18 is rotatable about an actuator shaft 22 fixed to the base 4. The actuator arm assembly 18 includes an actuator block 24 rotatably mounted on the actuator shaft 22 through a pair of bearings (not shown in FIG. 1), a plurality of actuator arms 26 extending horizontally from the actuator block 24 in one direction, and a head assembly 28 fixed to a front end portion of each actuator arm 26.

Each head assembly 28 includes a magnetic head 30 having an electromagnetic transducer for reading/writing data from/to the corresponding magnetic disk 10, and a suspension 32 having a front end portion supporting the magnetic head 30 and a base end portion fixed to the corresponding actuator arm 26. A coil 34 (see FIG. 2) is supported on the opposite side of the actuator arms 26 with respect to the actuator shaft 22. The coil 34 is inserted in a gap of the magnetic circuit 20. The magnetic circuit 20 and the coil 34 constitute a voice coil motor (VCM) 36. Reference numeral 38 denotes a flexible printed circuit board (FPC) for supplying a write signal to the electromagnetic transducer and for taking a read signal from the electromagnetic transducer. One end of the flexible printed circuit board 38 is fixed to a side surface of the actuator block 24.

Figure 2:
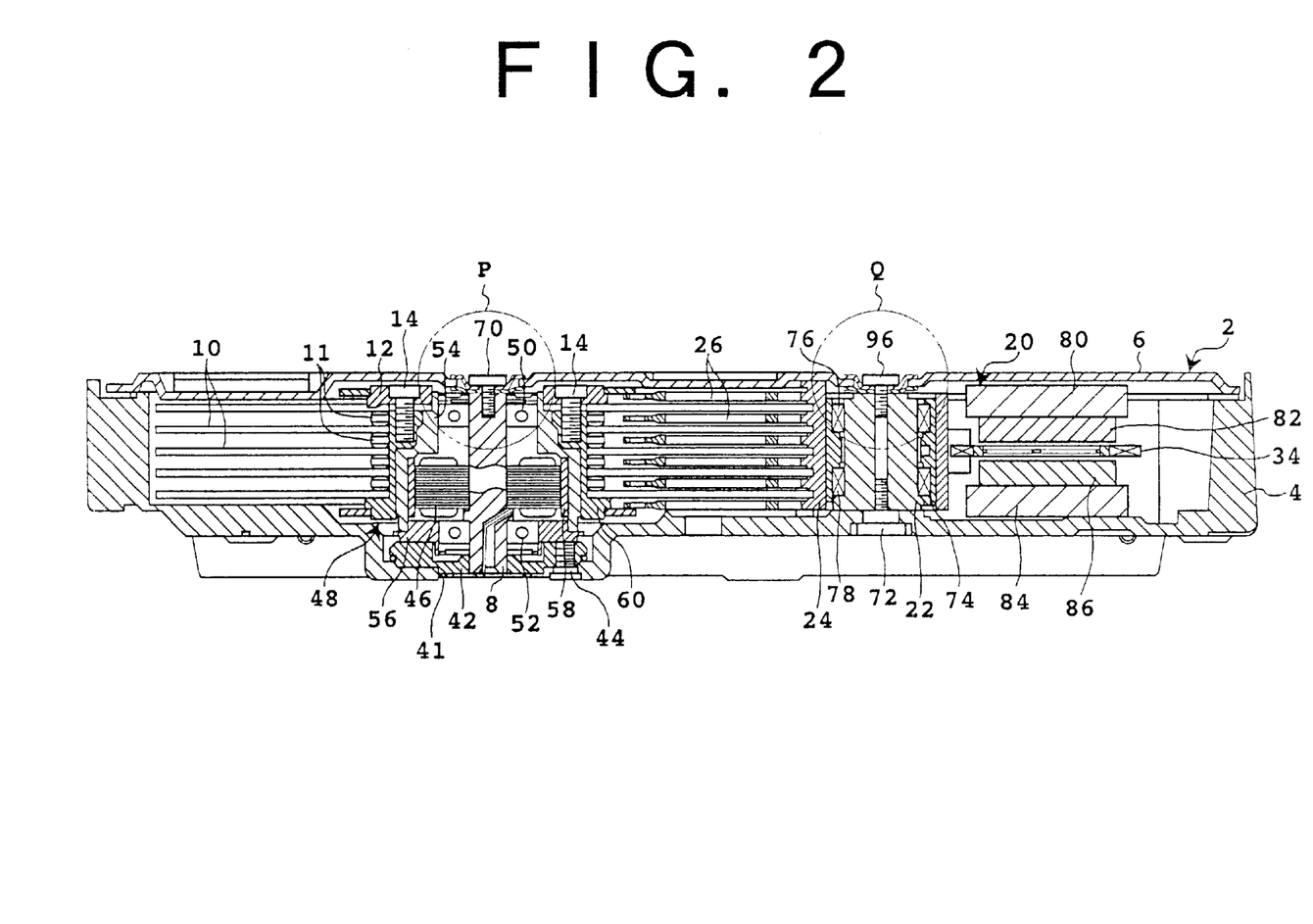
FIG. 2 is a sectional view of the magnetic disk drive according to the first preferred embodiment.

Referring to FIG. 2, there is shown a sectional view of the magnetic disk drive according to the first preferred embodiment. The base 4 is formed with a circular opening 41. A part of a flange 42 is inserted in the circular opening 41, and the flange 42 is fixed to the base 4 by a plurality of screws 44. The spindle shaft 8 is fixed to the flange 42 by press fitting. A coil 46 is fixed to the spindle shaft 8 by adhesion, and a rotor 48 is rotatably mounted on the spindle shaft 8 through a pair of bearings 50 and 52. That is, the inner races of the bearings 50 and 52 are fixed to the spindle shaft 8 by press fitting, and a sleeve 54 and an annular bushing 56 each serving as a yoke are fixed to the outer races of the bearings 50 and 52 by adhesion, respectively.

An annular permanent magnet 58 is bonded to the inner circumferential surface of the sleeve 54. A given gap is defined between the permanent magnet 58 and the coil 46, and a magnetic circuit is formed around the coil 46 by the permanent magnet 58 in cooperation with the yoke 54. A spindle hub 60 is fixed to the outer circumferential surface of the sleeve 54 by adhesion or the like. The plural magnetic disks 10 and annular spacers 11 are mounted on the spindle hub 60 so as to be alternately stacked, and the disk clamp 12 is secured to the spindle hub 60 by the plural screws 14 to thereby fixedly mount the plural magnetic disks 10 on the spindle hub 60 so as to be equally spaced a given distance from each other by the spacers 11.

Figure 3A:
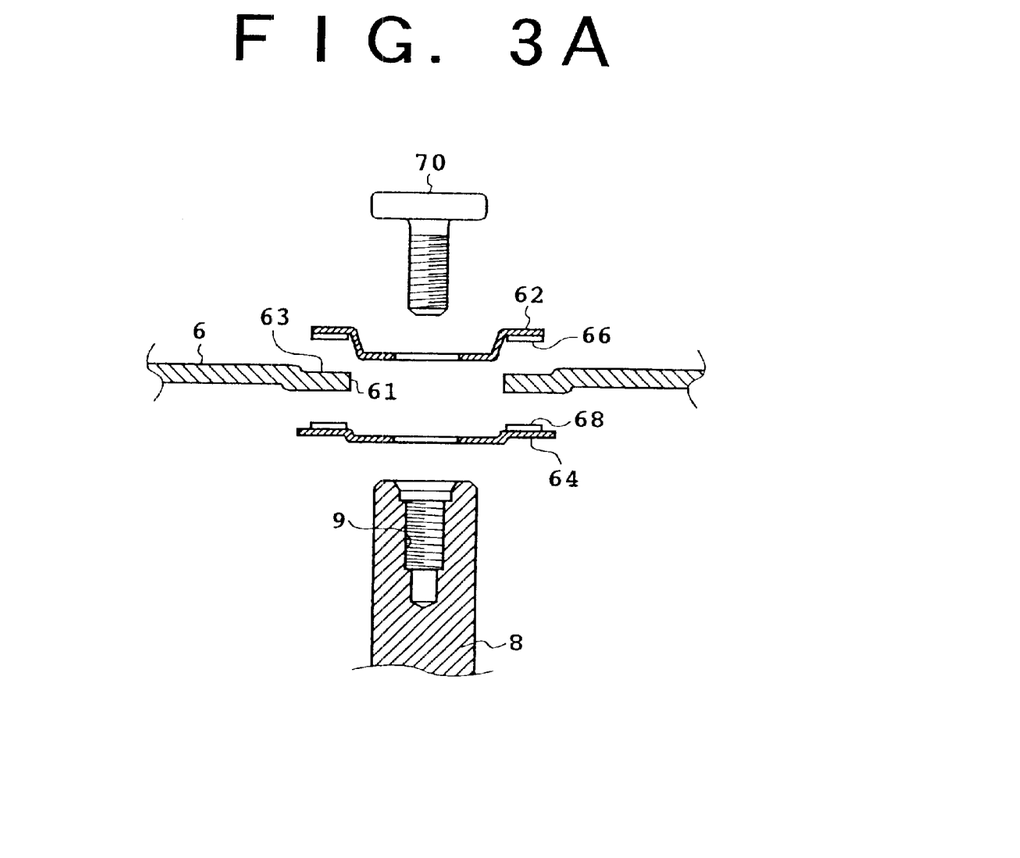
FIG. 3A is an enlarged view of an encircled portion P in FIG. 2, showing a condition before tightening a screw.
Figure 3B:
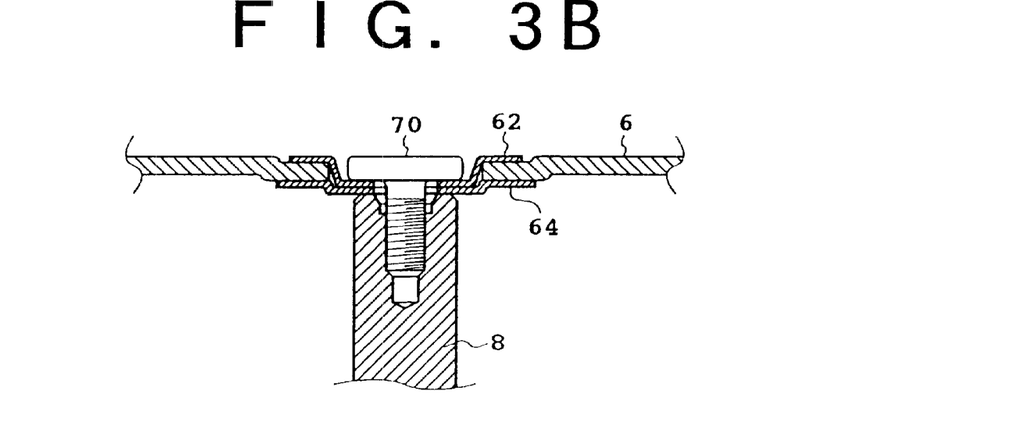
FIG. 3B is a view similar to FIG. 3A, showing a condition after tightening the screw.

Referring to FIGS. 3A and 3B, there is shown enlarged views of an encircled portion P in FIG. 2. FIG. 3A shows a condition before tightening a screw 70 into the spindle shaft 8, and FIG. 3B shows a condition after tightening the screw 70 into the spindle shaft 8. As shown in FIG. 3A, the cover 6 has a hole 61 at a portion corresponding to the upper end of the spindle shaft 8 fixed to the base 4, and a recess 63 formed around the hole 61. Reference numeral 62 denotes a first metal washer having an annular viscoelastic double-sided adhesive tape 66 attached thereto. The annular viscoelastic double-sided adhesive tape 66 is preliminarily attached to the lower side of the first metal washer 62. The first metal washer 62 is attached to the bottom surface of the recess 63 through the adhesive tape 66.

Reference numeral 64 denotes a second metal washer having an annular viscoelastic double-sided adhesive tape 68 attached thereto. The annular viscoelastic double-sided adhesive tape 68 is preliminarily attached to the upper side of the second metal washer 64. The second metal washer 64 is attached to the inner surface of the cover 6 at a portion around the hole 61. Thus, the cover 6 is sandwiched between the first metal washer 62 and the second metal washer 64 so that these washers 62 and 64 are aligned with each other. The first and second metal washers 62 and 64 are formed of stainless steel, for example. Each of the first and second metal washers 62 and 64 has an outer diameter larger than the diameter of the hole 61 of the cover 6. The first and second metal washers 62 and 64 have elasticity because they are formed of stainless steel. While a double-sided adhesive tape is used as the viscoelastic member in this preferred embodiment, various other materials such as alpha gel, butyl rubber, and adhesive may be adopted.

Figure 4A:
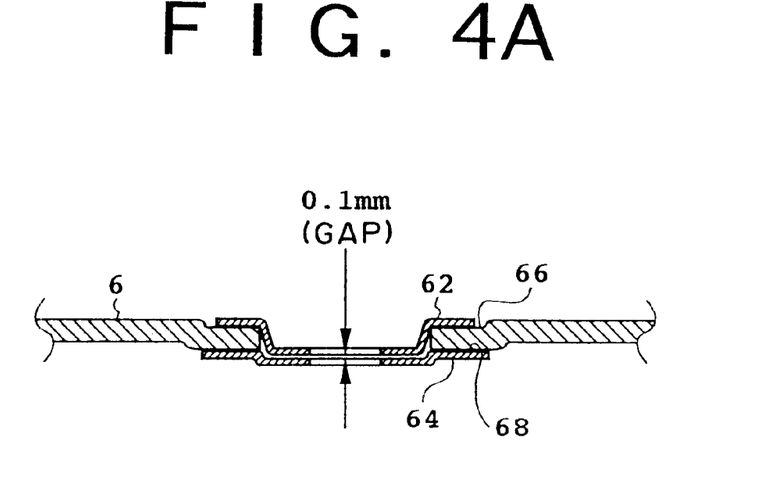
FIG. 4A is a sectional view illustrating a gap defined between two metal washers in an initial or free condition.
Figure 4B:
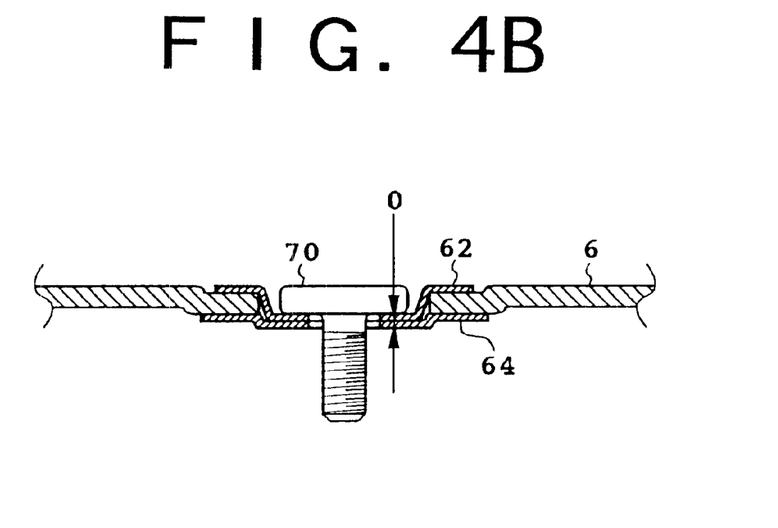
FIG. 4B is a sectional view illustrating a condition where the two metal washers are in close contact with each other after tightening the screw.

In the condition where the first and second metal washers 62 and 64 are attached to the cover 6, there is defined a gap of about 0.1 mm between the first and second metal washers 62 and 64 as shown in FIG. 4A. In the condition of FIG. 3B where the screw 70 is tightened into the spindle shaft 8, the annular viscoelastic double-sided adhesive tapes 66 and 68 are compressed by a tightening force applied to the screw 70, so that the first and second metal washers 62 and 64 come into close contact with each other. The screw 70 has a head having a diameter smaller than the diameter of the hole 61 of the cover 6. The tightened condition of the screw 70 is also shown in FIG. 4B, in which the spindle shaft 8 is not shown. As shown in FIG. 4B, there is no gap between the first and second metal washers 62 and 64 in the tightened condition of the screw 70 because these washers 62 and 64 are in close contact with each other.

Figure 5A:
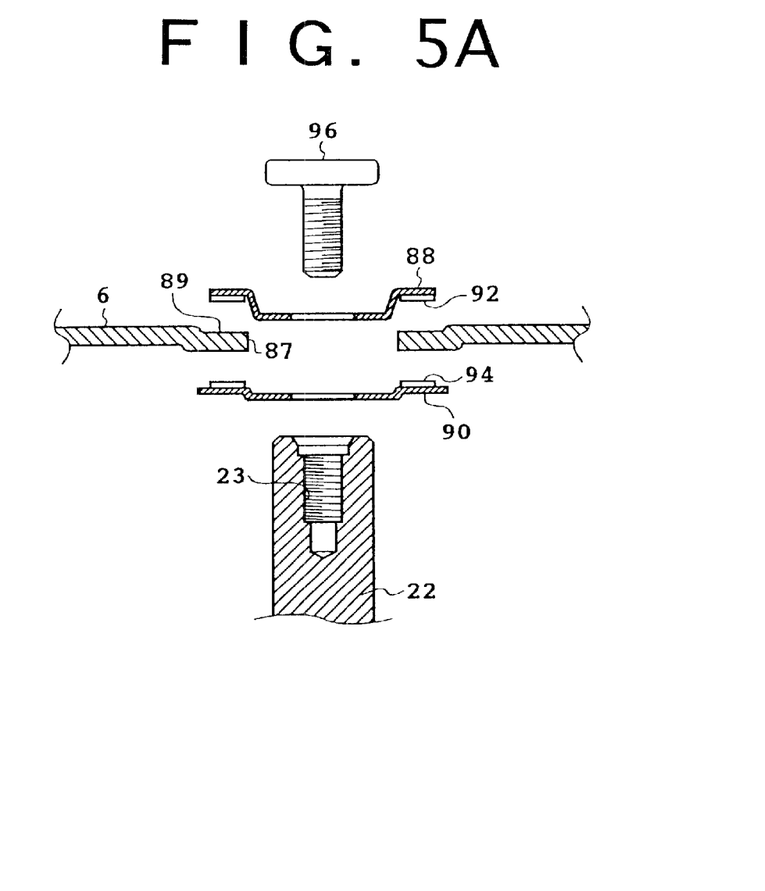
FIG. 5A is an enlarged view of an encircled portion Q in FIG. 2, showing a condition before tightening a second screw.
Figure 5B:
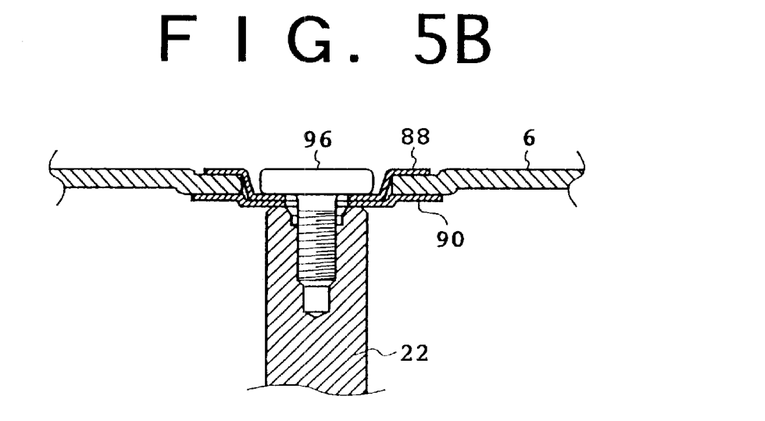
FIG. 5B is a view similar to FIG. 5A, showing a condition after tightening the second screw.

FIGS. 5A and 5B are enlarged views of an encircled portion Q in FIG. 2. FIG. 5A shows a condition before tightening a screw 96 into the actuator shaft 22, and FIG. 5B shows a condition after tightening the screw 96 into the actuator shaft 22. As shown in FIG. 5A, the cover 6 has a hole 87 at a portion corresponding to the upper end of the actuator shaft 22 fixed to the base 4, and a recess 89 formed around the hole 87.

Reference numeral 88 denotes a third metal washer having an annular viscoelastic double-sided adhesive tape 92 attached thereto. The annular viscoelastic double-sided adhesive tape 92 is preliminarily attached to the lower side of the third metal washer 88. The third metal washer 88 is attached to the bottom surface of the recess 89 through the adhesive tape 92. Reference numeral 90 denotes a fourth metal washer having an annular viscoelastic double-sided adhesive tape 94 attached thereto. The annular viscoelastic double-sided adhesive tape 94 is preliminarily attached to the upper side of the fourth metal washer 90. The fourth metal washer 90 is attached to the inner surface of the cover 6 at a portion around the hole 87. Thus, the cover 6 is sandwiched between the third and fourth metal washers 88 and 90 so that these washers 88 and 90 are aligned with each other. The third and fourth metal washers 88 and 90 are formed of stainless steel, for example. Each of the third and fourth metal washers 88 and 90 has an outer diameter larger than the diameter of the hole 87 of the cover 6. The screw 96 is tightened into the actuator shaft 22 through the third and fourth washers 88 and 90 attached to the cover 6 as shown in FIG. 5B. In this condition, the adhesive tapes 92 and 94 are compressed by a tightening force applied to the screw 96, so that the third and fourth metal washers 88 and 90 come into close contact with each other.

As in the case of tightening the screw 70 into the spindle shaft 8 shown in FIGS. 4A and 4B, there is defined a gap of about 0.1 mm between the third and fourth metal washers 88 and 90 in the condition where the screw 96 is not tightened, whereas there is no gap between the metal washers 88 and 90 in the condition where the screw 96 is tightened to the actuator shaft 22 because the metal washers 88 and 90 are in close contact with each other.

Figure 6:
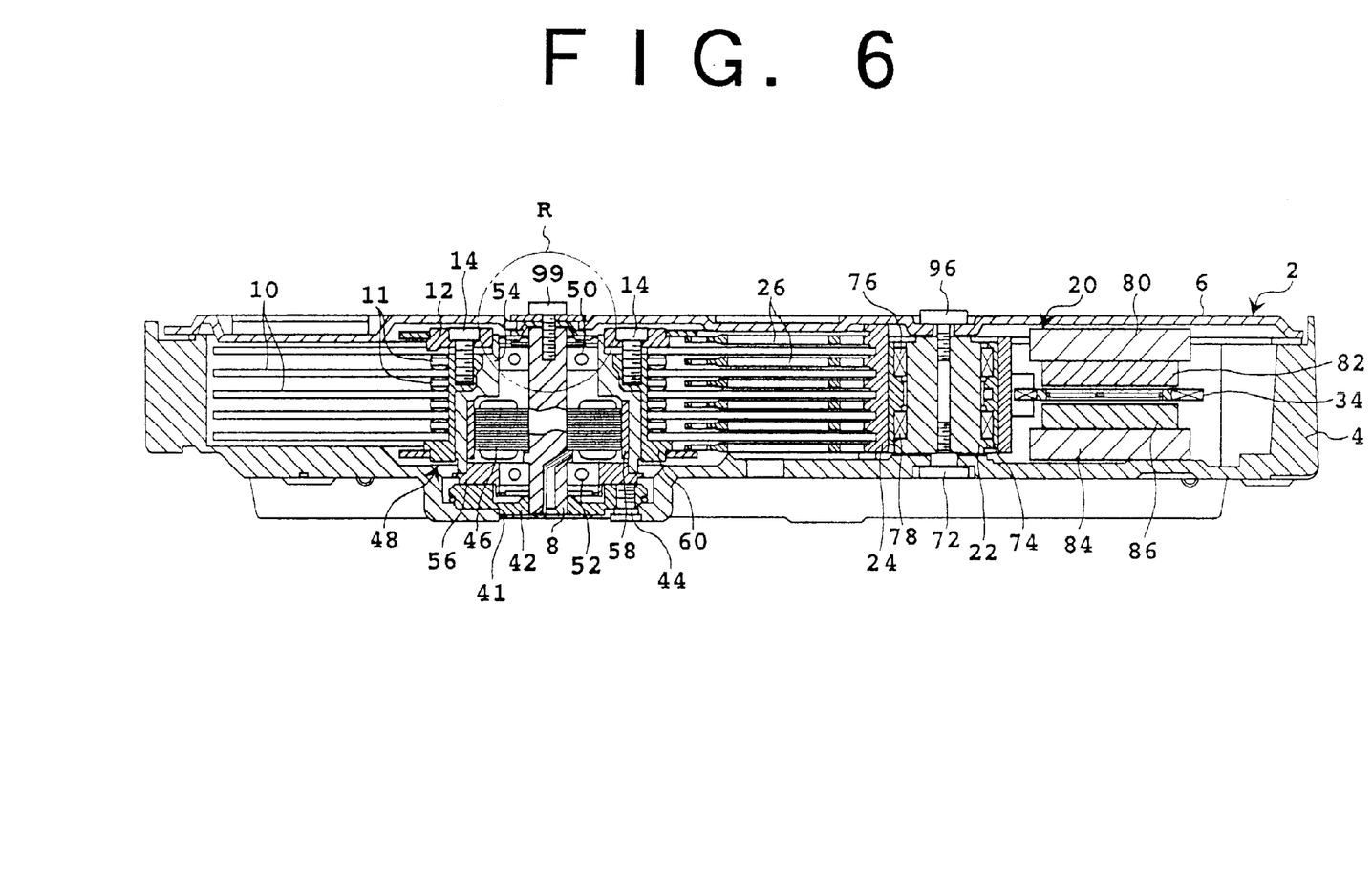
FIG. 6 is a sectional view of a magnetic disk drive according to a second preferred embodiment of the present invention.
Figure 7:
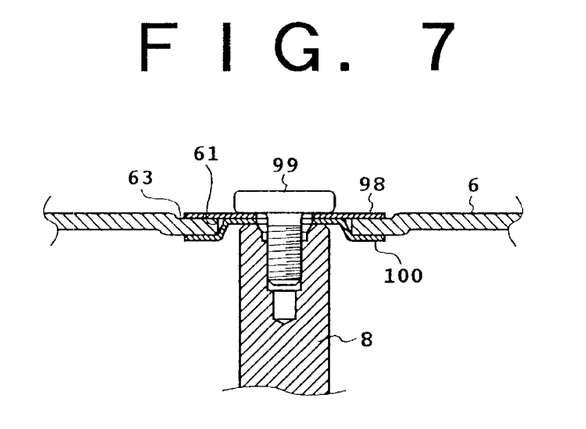
FIG. 7 is an enlarged view of an encircled portion R in FIG. 6.

Referring to FIG. 6, there is shown a sectional view of a magnetic disk drive according to a second preferred embodiment of the present invention. FIG. 7 is an enlarged view of an encircled portion R in FIG. 6. In this preferred embodiment, a screw 99 with a plane washer 98 is used to fix the upper end of the spindle shaft 8 to the cover 6. The other configuration of this preferred embodiment is similar to that of the first preferred embodiment shown in FIG. 2. That is, a metal washer 100 having an annular viscoelastic double-sided adhesive tape (not shown) preliminarily attached to the upper side thereof is attached to the inner surface of the cover 6 at a portion around the hole 61, and the screw 99 with the plane washer 98 having an annular viscoelastic double-sided adhesive tape (not shown) preliminarily attached to the lower side thereof is tightened into the spindle shaft 8. By tightening the screw 99 into the spindle shaft 8, the annular viscoelastic double-sided adhesive tapes of the plane washer 98 and the metal washer 100 are compressed, and the plane washer 98 and the metal washer 100 come into close contact with each other. The plane washer 98 and the metal washer 100 are formed of stainless steel, for example.

Like the first preferred embodiment shown in FIGS. 4A and 4B, there is defined a gap of about 0.1 mm between the plane washer 98 and the metal washer 100 in the condition where the screw 99 is not tightened, whereas there is no gap between the plane washer 98 and the metal washer 100 in the condition where the screw 99 is tightened into the spindle shaft 8. While the screw 96 is directly tightened to the actuator shaft 22 to fix the actuator shaft 22 to the cover 6 with no washers as shown in FIG. 6, a screw with a plane washer and a metal washer may be used to sandwich the cover 6 between the plane washer and the metal washer and thereby fix the actuator shaft 22 to the cover 6 as in the case of fixing the spindle shaft 8 to the cover 6.

According to the present invention, the two metal washers 62 and 64 are placed so as to be spaced apart from each other in the initial condition as shown in FIG. 4A, whereas when the screw 70 is tightened, the two metal washers 62 and 64 are elastically deformed by the tightening force of the screw 70 to come into close contact with each other as shown in FIG. 4B. In this manner, by tightening the screw to the spindle shaft or the actuator shaft, the two metal washers are elastically deformed to come into close contact with each other and to securely sandwich the cover. Accordingly, the screw is hardly loosened, and the creep of the viscoelastic member is also prevented by the spring effect of the metal washers. Further, according to the present invention, it was experimentally found that the vibrations of the cover due to the spindle motor can be reduced. In particular, it was experimentally found that the resonance of the cover at a specific vibration frequency at starting the magnetic disk drive can be remarkably reduced.

Figure 8:
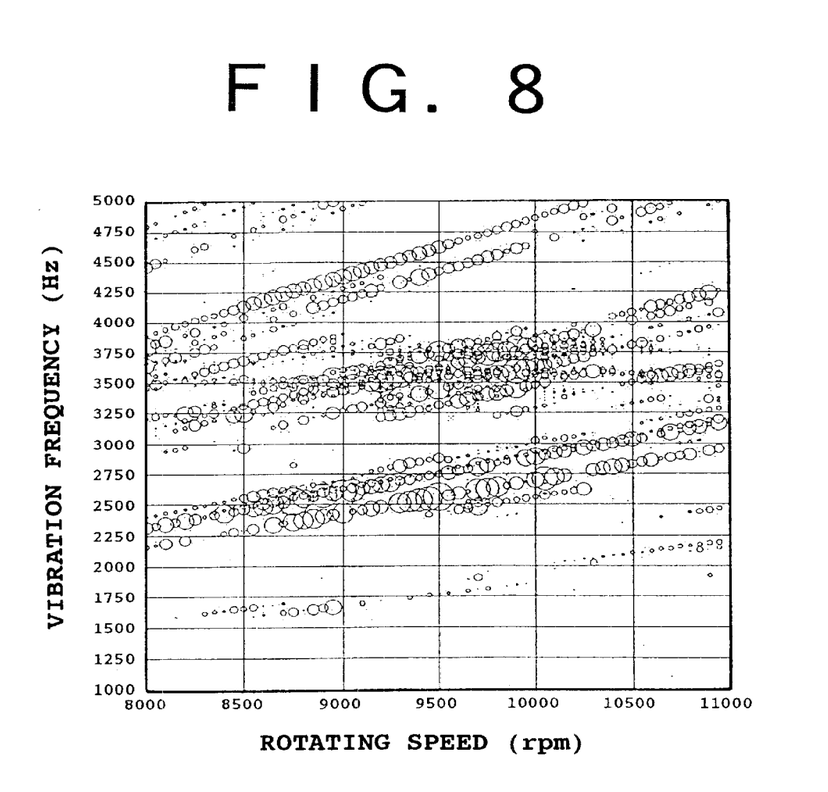
FIG. 8 is a Campbell chart showing the reduced vibrations of a housing according to the present invention.
Figure 9:
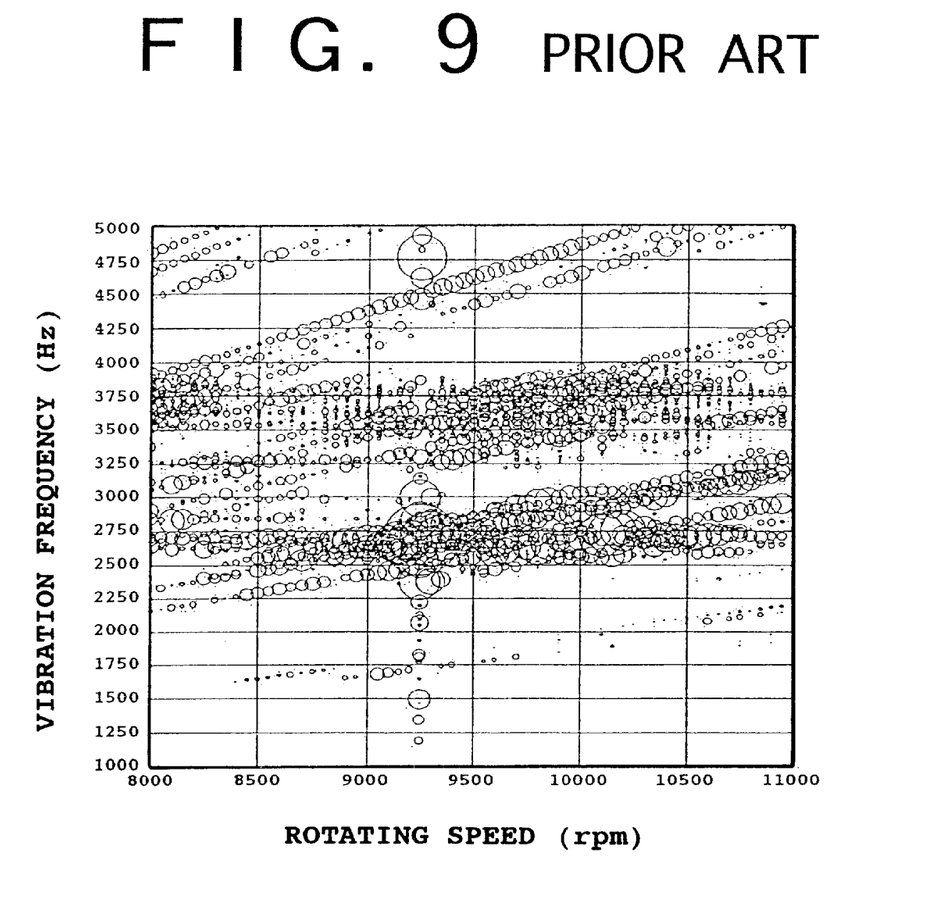
FIG. 9 is a Campbell chart showing the vibrations of a housing in the prior art.

FIG. 8 is a Campbell chart showing the reduced vibrations of the cover according to the present invention. In FIG. 8, the horizontal axis represents the rotating speed (rpm) of the spindle motor, and the vertical axis represents the vibration frequency (Hz) of the cover, in which the size of each circle shows the magnitude of the vibrations. FIG. 9 is a Campbell chart in the prior art wherein the upper end of the spindle shaft is directly fixed to the cover by the screw without the use of metal washers.

As apparent from the comparison of FIGS. 8 and 9, a vibration component due to the spindle motor remarkably appearing at a vibration frequency of 2.7 kHz in the prior art is improved by about 20 dB according to the present invention.

Table 1 shows a noise level reducing effect according to the present invention in comparison with the prior art.

TABLE 1

(in dB)

|  | Ready | Seek |
| --- | --- | --- |
| Prior Art | 38.8 | 43.5 |
| Present Invention | 36.5 | 41.5 |

As apparent from Table 1, the noise level in a ready condition is improved by about 2 dB according to the present invention in comparison with the prior art, and the noise level in seeking is also improved by about 2 dB according to the present invention in comparison with the prior art.

According to the present invention as described above, the screw for securing the shaft to the cover is hardly loosened, so that the creep of the viscoelastic member interposed between the cover and each metal washer can be effectively prevented. Further, the vibrations of the cover due to the spindle motor can be suppressed. In particular, the resonance of the cover at a specific vibration frequency conventionally occurring at starting a magnetic disk drive can be effectively prevented. Moreover, the noise level in the ready condition of a magnetic disk drive can be improved, and the noise due to the swing motion of the actuator can also be reduced.

What is claimed is:

1. A magnetic disk drive comprising:
    a base;
    a spindle shaft fixed to said base;
    a coil mounted on said spindle shaft;
    a spindle hub rotatably mounted on said spindle shaft;
    a magnetic disk fixed to said spindle hub and having a plurality of tracks;
    a permanent magnet fixed to said spindle hub so as to define a gap between said coil and said permanent magnet;
    a magnetic head for reading/writing information from/to said magnetic disk;
    an actuator for moving said magnetic head across said tracks of said magnetic disk;
    a cover fixed to said base and having a hole at a position corresponding to said spindle shaft;
    a first metal washer placed on said cover at a portion around said hole and having an outer diameter larger than the diameter of said hole;
    a second metal washer for sandwiching said cover at said portion around said hole in cooperation with said first metal washer, said second metal washer having an outer diameter larger than the diameter of said hole; and
    a screw for securing said first and second metal washers to said spindle shaft.

2. A magnetic disk drive according to claim 1, further comprising:
    a first annular viscoelastic member interposed between said first metal washer and said cover; and
    a second annular viscoelastic member interposed between said second metal washer and said cover.

3. A magnetic disk drive according to claim 1, wherein when said screw is not tightened, said first and second metal washers are spaced from each other, whereas when said screw is tightened, said first and second metal washers come into close contact with each other.

4. A magnetic disk drive comprising:
    a base;
    a spindle shaft fixed to said base;
    a coil mounted on said spindle shaft;
    a spindle hub rotatably mounted on said spindle shaft;
    a magnetic disk fixed to said spindle hub and having a plurality of tracks;
    a permanent magnet fixed to said spindle hub so as to define a gap between said coil and said permanent magnet;
    a magnetic head for reading/writing information from/to said magnetic disk;
    an actuator for moving said magnetic head across said tracks of said magnetic disk, said actuator having an actuator shaft fixed to said base;
    a cover fixed to said base and having a hole at a position corresponding to said actuator shaft;
    a first metal washer placed on said cover at a portion around said hole and having an outer diameter larger than the diameter of said hole;
    a second metal washer for sandwiching said cover at said portion around said hole in cooperation with said first metal washer, said second metal washer having an outer diameter larger than the diameter of said hole; and
    a screw for securing said first and second metal washers to said actuator shaft.

5. A magnetic disk drive according to claim 4, further comprising: a first annular viscoelastic member interposed between said first metal washer and said cover; and a second annular viscoelastic member interposed between said second metal washer and said cover.

6. A magnetic disk drive according to claim 4, wherein when said screw is not tightened, said first and second metal washers are spaced from each other, whereas when said screw is tightened, said first and second metal washers come into close contact with each other.

7. A magnetic disk drive comprising:

a base;

a spindle shaft fixed to said base;

a coil mounted on said spindle shaft;

a spindle hub rotatably mounted on said spindle shaft;

a magnetic disk fixed to said spindle hub and having a plurality of tracks;

a permanent magnet fixed to said spindle hub so as to define a gap between said coil and said permanent magnet;

a magnetic head for reading/writing information from/to said magnetic disk;

an actuator for moving said magnetic head across said tracks of said magnetic disk, said actuator having an actuator shaft fixed to said base;

a cover fixed to said base and having a first hole at a position corresponding to said spindle shaft and a second hole at a position corresponding to said actuator shaft;

a first metal washer placed on said cover at a portion around said first hole and having an outer diameter larger than the diameter of said first hole;

a second metal washer for sandwiching said cover at said portion around said first hole in cooperation with said first metal washer, said second metal washer having an outer diameter larger than the diameter of said first hole;

a first screw for securing said first and second metal washers to said spindle shaft;

a third metal washer placed on said cover at a portion around said second hole and having an outer diameter larger than the diameter of said second hole;

a fourth metal washer for sandwiching said cover at said portion around said second hole in cooperation with said third metal washer, said fourth metal washer having an outer diameter larger than the diameter of said second hole; and a second screw for securing said third and fourth metal washers to said actuator shaft.

8. A magnetic disk drive according to claim 7, further comprising: a first annular viscoelastic member interposed between said first metal washer and said cover; a second annular viscoelastic member interposed between said second metal washer and said cover; a third annular viscoelastic member interposed between said third metal washer and said cover; and a fourth annular viscoelastic member interposed between said fourth metal washer and said cover.

9. A magnetic disk drive according to claim 7, wherein when said first screw is not tightened, said first and second metal washers are spaced from each other, whereas when said first screw is tightened, said first and second metal washers come into close contact with each other; and when said second screw is not tightened, said third and fourth metal washers are spaced from each other, whereas when said second screw is tightened, said third and fourth metal washers come into close contact with each other.

* * * * *